Feb. 8, 1966  J. V. MAJEWSKI  3,233,853
AERIAL CABLE BRACKETS
Filed Feb. 19, 1964  2 Sheets-Sheet 1

INVENTOR.
JOHN V. MAJEWSKI
BY
ATTORNEY.

Feb. 8, 1966     J. V. MAJEWSKI     3,233,853
AERIAL CABLE BRACKETS
Filed Feb. 19, 1964     2 Sheets-Sheet 2
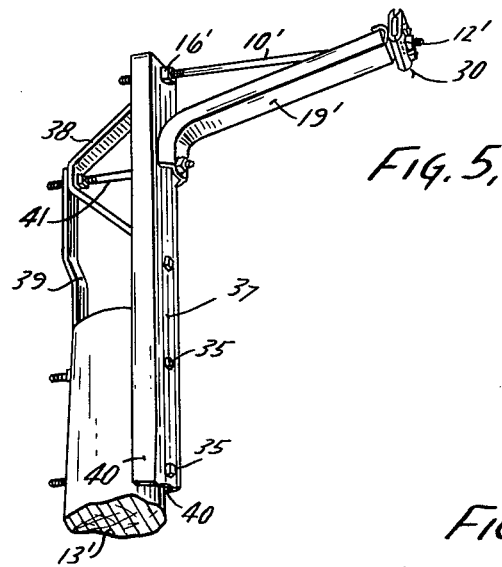
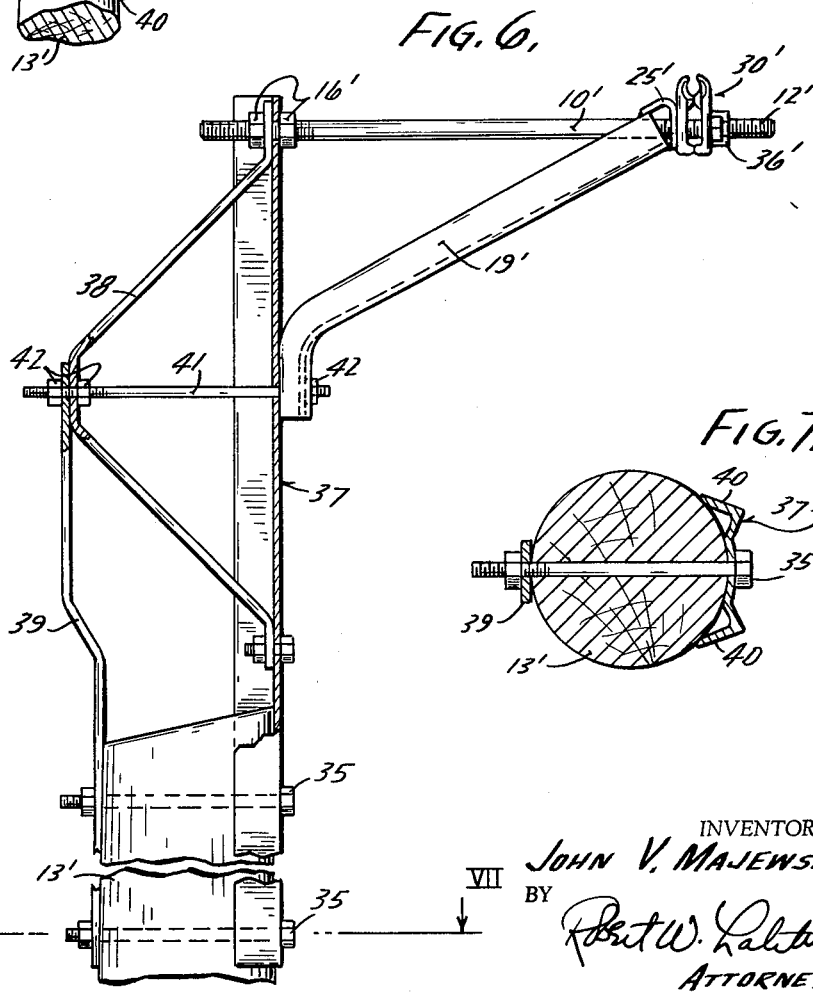
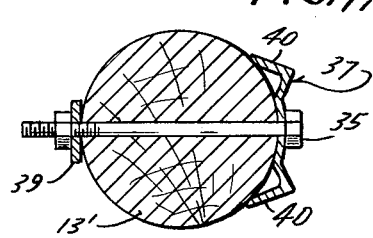
INVENTOR.
JOHN V. MAJEWSKI
BY
ATTORNEY.

United States Patent Office 3,233,853
Patented Feb. 8, 1966

3,233,853
AERIAL CABLE BRACKETS
John V. Majewski, Milwaukee, Wis., assignor to McGraw-Edison Company, Milwaukee, Wis., a corporation of Delaware
Filed Feb. 19, 1964, Ser. No. 345,891
6 Claims. (Cl. 248—74)

This invention relates to aerial cable systems and, more particularly, to an improved bracket for supporting cable.

In the construction of cable supporting brackets it is common to use a cantilevered structure that is subject to bending moments as a load is applied at the end away from the pole which tends to cause a downward bending of the bracket. Such a design is frequently utilized in spite of such difficulties to achieve the greatest possible height for the supported cable.

In the bracket of the present invention the applicant has provided a bracket that effectively utilizes tensile and compressive members respectively in conditions of almost pure tension and pure compression, and in addition provides a configuration that attains the optimum height and effectively limits the effects of bending moments to which portions of the bracket elements may be subjected.

It is an object of this invention to provide an aerial cable bracket of greater reliability which increased load carrying capabilities.

It is also an object of this invention to provide an aerial cable bracket wherein the elements are individually subjected to the type of loading for which they are best adapted.

It is a further object of this invention to provide a bracket wherein the effect of bending moments is minimized.

It is a further object of this invention to provide a bracket which affords a maximum support height.

These and other objects and advantages of this invention will become apparent from the following description when taken in connection with the accompanying drawings wherein:

FIG. 5 is a perspective view of a second embodiment of the invention utilized with a pole-top extension structure;

FIG. 6 is a side elevation of the bracket and extension of FIG. 5, partly in section and partly broken away; and FIG. 7 is a section view taken along line VII—VII of FIG. 6.

Figure 1:
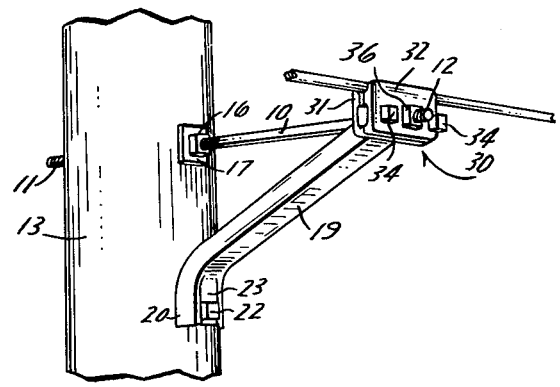
FIG. 1 is a perspective view of the aerial cable bracket incorporating the invention mounted on a pole.
Figure 2:
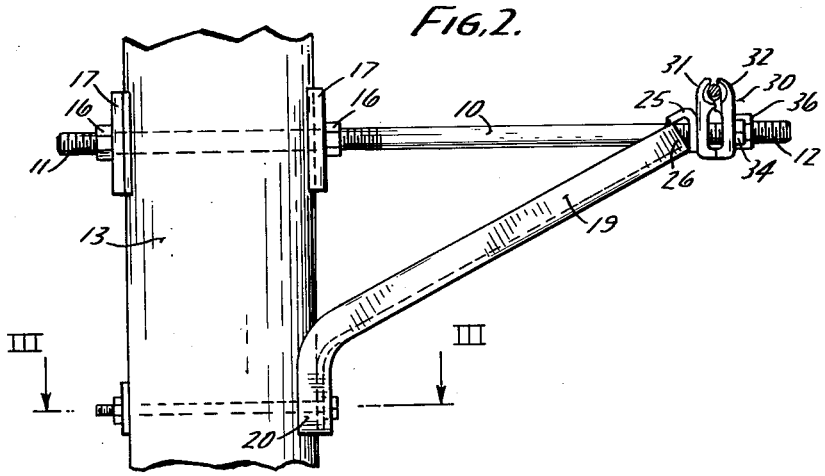
FIG. 2 is a side elevation of the bracket of FIG. 1.

Referring to FIGS. 1-4, a horizontal rod 10 with threaded end portions 11 and 12 extends through a cooperating pole 13 and is secured thereto by nuts 16 secured to the threaded portion and disposed at opposite sides of the pole. The plates 17 respectively interposed between the pole 13 and the nuts 16 distribute the force applied to the pole.

Figure 3:
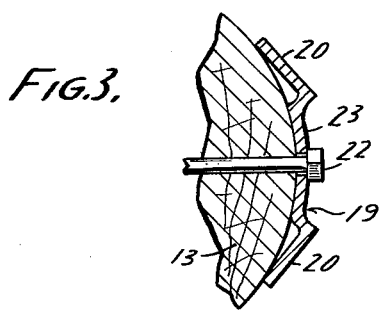
FIG. 3 is a section view of the bracket and part of the pole taken along line III—III of FIG. 2.

A channel shaped member 19 is inclined upwardly toward the threaded distal end 12 of the rod 10 with the flanges 20 at the lower end adjacent the pole 13 turned outwardly to present a greater surface area in contact with the pole (which configuration is best shown in FIG. 3). A through bolt 22 extends through the web portion 23 of channel shaped member 19 securing the channel member to the pole. The member 19 need not be channel shaped as in the illustrated embodiment, but may be formed of any section which is well adapted to carry a compressive load.

Figure 4:
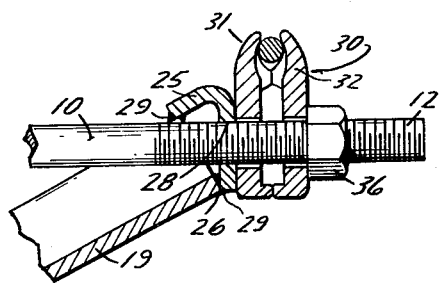
FIG. 4 is a partial vertical section of the bracket of FIG. 1 with the portion of the bracket of FIG. 1 with the portions adjoining the pole broke away.

As seen in FIG. 4, an end plate 25 is rigidly connected to the channel member end 26 that is away from the pole by welds 29 to form a unitary structure therewith and this end plate is engaged by the rod member end portion 12 at a threaded opening 28 therethrough. A load supporting member which in this embodiment is a messenger clamp 30, having jaw members 31 and 32 secured to one another by bolts 34, is mounted about the rod end 12 and secured against the end plate 25 by the nut 36.

By having the rod 10 extend horizontally from the pole 13, the messenger clamp 30 is supported at the highest practicable location with the principal bracket elements functioning to carry the load for which each is best adapted. The horizontally extending rod 10 is in practically pure tension and the inclined channel 19 in almost pure compression. Many alternate configurations of this bracket can be used, such as inclining the rod downwardly with the channel cantilevered horizontally outward. However, in the configuration shown, the desirable physical properties of the elements are utilized while maintaining the load carrying clamp at a higher location above the ground.

A further characteristic which enhances the loadbearing ability of the bracket is the manner of mounting the messenger clamp. By threading the rod end 12 through the end plate 25 and holding the supported messenger clamp 30 between end plate 25 and nut 36, only the rod elongation between the plate 25 and nut 36 need be considered in determining the bending stresses exerted on the rod as a result of elongation under load. The elongation of all of any major portion of the rod 10 cannot be transmitted to the clamp location to contribute to the failure of the bracket through bending. The load carrying ability of the structure is further enhanced by the prestressed conditions that exist with respect to the rod end and the clamping nut 36 and end plate 25. The end plate 25 and the clamping means for securing the load carrying member to the bracket about the rod end may take various forms wherein the load carrying member is positively secured adjacent the juncture of the rod 10 and the channel 19 in such manner that the elongation of only a short length of the rod can occur intermediate the clamping means.

In the embodiment of FIGS. 5, 6 and 7 a pole-top extension secured to the pole by bolts 35 comprises a channel 37 and formed bar members 38 and 39 effectively extends the height of the pole 13'. As seen in FIG. 7, the lower ends of the channel member 37 of the extension has outwardly turned flanges 40 to obtain greater surface contact with the pole 13'. The bracket elements correspond respectively to those of FIGS. 1-4, differing only in being adapted to mounting on the pole-top extension, rather than directly to the pole. Rod 10' is secured to the extension elements 37 and 38 by nuts 16', and the lower turned portion of the channel 19' is secured by the rod member 41 and cooperating nuts 42 to the extension members 37, 38 and 39.

Although but two embodiments have been shown and described, it will be apparent to those skilled in the art that various changes and modifications may be made therein without departing from the spirit of the invention or the scope of the appended claims.

What is claimed is:

1. In combination with a utility pole an aerial cable bracket comprising a generally channel shaped compressive load carrying member having a pole engaging portion, an angular offset portion and an outer end plate, said pole engaging portion having flared flange portions to increase the pole engaging surface and said end plate having a threaded bore extending therethrough, a substantially horizontally extending rod member secured at one end to said pole with the end opposite said one end being threaded and received in said threaded bore with a portion thereof extending beyond said end plate, a load supporting member received about said rod end portion extending beyond said end plate, means threadably received by said rod to secure said load supporting member against said end plate.

2. In combination with a support structure, an aerial cable bracket mounted on said supporting structure comprising a compressive load carrying member having one end secured to said structure and extending away from said structure and carrying a plate portion as a unitary part thereof adjacent the end opposite said one end, said plate portion having a threaded bore therethrough, a tensile load carrying rod member secured to said structure at one end with the end opposite said one end being threaded and received in said bore with a portion thereof extending beyond said plate, said member portions secured to said supporting structure being vertically spaced with said rod member overlying said compressive load carrying member, a load supporting member received about and supported by said rod portion extending beyond said plate and means secured to and carried by said rod compressively retaining said clamp member between said securing means and said plate.

3. In combination with a support structure, an aerial cable bracket mounted on said support structure comprising a channel shaped first member having a supporting structure engaging portion at one end; an intermediate portion extending angularly away from said support structure with an end plate rigidly secured to said channel adjacent the end opposite said one end, said plate having a threaded bore extending therethrough; connecting means securing said supporting structure engaging portion to said supporting structure, a second member secured at one end to said support structure, the opposite of said one end extending beyond said plate portion, a load carrying member received about said rod end portion, internally threaded securing means carried by said rod end portion for compressively holding said load carrying member between said securing means and said plate portion.

4. In combination with a pole, an aerial cable bracket comprising a compressive load carrying member having a first end portion abutting and secured to said pole, said compressive load carrying member extending away from said pole and terminating at the end opposite said one end in an end plate with a threaded opening extending therethrough; a tensile load carrying member having a first end portion extending through said pole and secured thereto in vertically spaced relation above the interconnection between said compressive load carrying member and said pole, said tensile load carrying member having a second end portion threadably received in said end plate threaded opening with the distal portion of said second end portion extending beyond said plate; a load carrying member supported about said distal portion; and securing means carried by said distal end and compressively retaining said load carrying member against said end plate.

5. In combination with an upright support structure and a load supporting member, an aerial cable bracket comprising a compressive load carrying member having a support engaging end portion, an intermediate portion extending away from said support structure and an end plate with an aperture therein forming a unitary part thereof and disposed adjacent the end of said compressive load carrying member opposite said support engaging end portion; a tensile member having a portion secured to said support structure in overlying spaced relation to said compressive member support engaging end portion, said tensile member extending away from said structure and extending through said end plate aperture and load supporting member; and means for releasably clamping said load carrying member against said end plate and preventing transmission of elongation of said rod between said support structure and said end plate to said road portion passing through said load supporting member.

6. In combination with a support structure, an aerial cable bracket mounted on said support structure comprising a tensile member with first and second end portions; a compressive member having first and second end portions with said first end portion secured to said support structure and an intermediate portion extending upwardly and angularly outward from said support structure; said tensile member secured to said support structure at said first end portion thereof and extending away from said support structure in overlying relation to said compressive member with said tensile member second end portion extending through said compressive member second end portion with the distal terminal end portion extending beyond said compressive member; means preventing axial movement of said compressive member second end portion along the axis of said tensile member toward said support surface; a load supporting member disposed about said distal terminal end portion; and securing means carried by said tensile member compressively retaining said load supporting member against said compressive member second end portion, whereby elongation of said tensile member between said support structure and said compressive member second end portion cannot be transmitted beyond said compressive member second end portion.

References Cited by the Examiner
UNITED STATES PATENTS

| 1,580,316 | 4/1926 | Moreton | 248—226.4 X |
| 1,754,082 | 4/1930 | Chase | 248—221 |
| 2,099,465 | 11/1937 | Burleson | 248—74 |
| 2,504,360 | 4/1950 | Van Auken | 248—61 |
| 2,540,784 | 2/1951 | Hocher | 248—221 |
| 2,696,357 | 12/1954 | Elmer | 248—221 |
| 2,884,670 | 5/1959 | Garrison et al. | 248—221 X |
| 3,042,353 | 7/1962 | O'Mara | 248—74 |

CLAUDE A. LE ROY, *Primary Examiner.*